United States Patent Office 3,224,848
Patented Dec. 21, 1965

3,224,848
GASOLINE COMPOSITION
Hubert T. Henderson, Pleasant Hill, Calif., assignor to Shell Oil Company, a corporation of Delaware
No Drawing. Filed Mar. 16, 1959, Ser. No. 799,483
12 Claims. (Cl. 44—56)

This invention relates to gasoline compositions for spark ignition internal combustion engines, and especially for such automotive engines having high compression ratios.

Since automobiles were first manufactured the compression ratios of their engines have steadily increased. This increase in compression ratio has made possible greater power for the same size engine, and more efficient utilization of the gasoline fuel, but it has of course necessitated the use of fuels of increasing resistance to detonationfi or knock. Heretofore it has been possible, by the development of new hydrocarbon conversion processes, for example catalytic cracking and catalytic reforming, to manufacture gasolines with steadily increasing resistance to detonation adequate for use in higher compression ratio automotive engines, although the cost of the gasoline has of course risen because of the more expensive processesing required and in some cases because of reductions in yield.

Recently, however, the trend in design of automotive engines has presented a problem of a more complicated nature to gasoline manufacturers. Automotive engines operate under widely different combustion chamber conditions so that under some operating conditions the engine has a greater tendency to make the gasoline knock (i.e., "stresses the fuel to a greater extent) than under other operating conditions. At the same time gasoline fuels, depending upon their compositions, vary in their resistance to detonation with changing operating conditions of the engine. For example, when testing two gasolines of different compositions in the same engine one may find that both gasolines have just adequate knock-resistance in the engine at low speeds and that as the speed of the engine is increased, resulting in higher combustion chamber temperatures, one of the fuels is still adequately knock-resistant while the other detonates or knocks. The term "sensitivity" is used to define this difference among gasoline fuels; in this example the second gasoline has a higher "sensitivity" then the first gasoline, i.e., it is more "sensitive" to a change in the engine operation toward conditions of greater stress on the fuel.

The resistance of a gasoline to detonation is conventionally measured by standardized laboratory engine tests. The Research Method (ASTM Method D–908, Coordinating Research Council Designation F–1–545) measures the octane number of a gasoline under relatively mild, low-speed operating conditions. The Motor Method (ASTM Method D–357, Coordinating Research Council Designation F–2–545) measures the octane number of a fuel under relatively severe conditions of high speeds and high temperatures. The sensitivity of a given gasoline fuel, i.e., the response of the fuel to the change in engine severity between the operating conditions of the research and motor methods, is quantitatively defined as the Research Method octane number minus the Motor Method octane number.

Design trends in recently manufactured automobiles have been such as to make the knock resistance of gasoline fuels under these conditions of greater fuel stress more important than formerly. For example, maximum horsepower of some recent automobiles is developed at speeds as high as about 4000 r.p.m.; this is almost double the "peak power r.p.m." of about 25 years ago. New transmission systems, for example the fluid turbine, have made possible higher engine speeds at low road speeds, thus taking advantage of the greater power developed at high engine speeds. This higher average engine speed results in higher average combustion chamber temperatures. Also improved engine design has reduced the pressure drop through the fuel intake system, resulting in higher air-fuel mixture densities, which is another factor contributing to increased stress on the fuel. The result of all these factors is that modern automotive engines are not only coming to require fuels of increased knock-resistance but are coming to require fuels of reduced sensitivity also.

Until recent years, catalytically cracked gasoline was the predominant component of high-octane motor gasoline. Due to the high octane of the catalytically cracked gasoline it was possible to blend with it minor amounts of lower octane materials such as straight-run gasoline and still meet the octane number demanded of the fuel. Such a gasoline fuel would not detonate in an automobile at low-speed, high-load conditions and it could be depended upon to be adequate at the higher speeds also. This was because the gasoline had a sensitivity lower than was needed as a result of the low-sensitivity straight-run material present, which more than adequately offset the high sensitivity of the olefinic cracked gasoline.

However, to achieve the increasingly higher octane required of automotive fuels, the refiner has had to resort to the use of high-octane components produced by newly developed conversion processsess, such as reformates from the catalytic reforming process. In the catalytic reforming process low-octane straight-run naphthas are converted into high-octane aromatic reformates. These aromatic reformates, although not as sensitive as olefinic catalytically cracked gasoline, are considerably more sensitive than the straight-run naphtha from which they are derived. Thus at the same time that automotive engines have come to require fuels less sensitive than would have been satisfactory heretofore, the trend has been to higher sensitivities in commercially available gasolines. This is shown in Table I for the period from 1931 to 1958. The average compression ratio for automotive engines during this period has risen from 5.23 in 1931 to about 9.47 in 1958.

TABLE I

*National average sensitivity of premium automotive gasolines*

| Period | Octane numbers | | |
|---|---|---|---|
| | Research | Motor | Sensitivity |
| Winter 1931–32 | *76.1 | 73.0 | 3.1 |
| Winter 1936–37 | *80.1 | 76.6 | 3.5 |
| Winter 1941–42 | 85.2 | 79.7 | 5.5 |
| Winter 1946–47 | 86.0 | 79.2 | 6.8 |
| Winter 1947–48 | 86.8 | 79.7 | 7.1 |
| Winter 1948–49 | 87.3 | 80.1 | 7.2 |
| Winter 1949–50 | 89.6 | 81.4 | 8.2 |
| Winter 1950–51 | 91.1 | 82.9 | 8.2 |
| Winter 1951–52 | 90.7 | 82.5 | 8.2 |
| Winter 1952–53 | 91.5 | 83.1 | 8.4 |
| Winter 1953–54 | 92.9 | 84.1 | 8.8 |
| Winter 1954–55 | 94.5 | 85.2 | 9.3 |
| Winter 1955–56 | 96.2 | 86.6 | 9.6 |
| Winter 1956–57 | 97.4 | 87.4 | 10.0 |
| Winter 1957–58 | 98.4 | 87.9 | 10.5 |

*Research Method not in official use prior to 1941.

To meet the need for increasingly higher octane number gasolines it has been proposed to increase severity of the catalytic reforming process. Severity is increased by reducing pressure and increasing temperature in the reforming conversion zone. Aromaticity and therefore octane rating of the reformate can be increased in this manner but at the expense of greatly reduced reformate yield and decreased catalyst life. Moreover, another serious disadvantage under present circumstances is that the Motor Method octane number of increasingly higher severity reformate does not rise as fast as the Research Method octane number and thus the sensitivity of the reformate also rises.

One method proposed to obtain some relief from the tendency toward high sensitivity motor gasoline has been the addition of aviation alkylate to motor gasoline. However, this is an expensive expedient at best since the volume of alkylate required to effectively reduce sensitivity of motor gasoline is large, and only a limited volume is presently available over the amount required in aviation gasoline manufacture, without building additional high-cost alkylation plants. Another method which has been proposed is hydrogenation of catalytically cracked components to convert olefins into saturates. Hydrogenation reduces sensitivity mainly by increasing the Motor Method octane number and partly by reducing the Research Method octane number. This loss in Research Method octane number can rarely be tolerated; consequently the hydrogenation method has not been looked upon with favor.

The principal object of the present invention is to provide a commercially practical high-octane-number gasoline of low sensitivity. A more particular object is to provide such an automotive gasoline composition which provides more optimum utilization of available gasoline hydrocarbon streams in a modern petroleum refinery. Still another object of the invention is to provide such a gasoline with superior resistance to detonation under all operating conditions of modern automobile engines. Other objects of the invention will be apparent in the description thereof herein.

It has long been known that alkyl ethers, especially branched-chain alkyl ethers, have high octane numbers. Such ethers have heretobefore been proposed as gasoline blending agents. For example, in Buc, U.S. 2,046,243, June 30, 1936, it was proposed use such ethers in a relatively low octane number gasoline (68.2) to increase the octane number thereof to, for example, 77.5 or 87.4. In Evans et al., U.S. 2,409,746, October 22, 1946, it was proposed to use ethers in aviation gasoline, the hydrocarbon components of which have an octane number greater than the ether, to increase the "allowable boost ratio" of the gasoline.

It has now been discovered that the addition of lower boiling branched-chain dialkyl ethers to a particular type of high-octane-number hydrocarbon gasoline mixture results in a final gasoline blend of not only unexpectedly higher Research Method octane number but an even greater Motor Method octane number than the base hydrocarbon blend, thus reducing the sensitivity of the fuel while increasing its octane number. The resulting reduction in sensitivity of the fuel is an especially unexpected development. For example, pure methyl tertiary-butyl ether has a Research Method octane number of 110.1, a Motor Method octane number of 100.6, and therefore a sensitivity of 9.5. However, a blend of 20% by volume methyl tertiary-butyl ether, in a base gasoline containing 20% by volume naphthenes, 47% by volume aromatics, 1% by volume olefins, and 32% by volume paraffins, and which has a Research Method octane number of 97.1, a Motor Method octane number of 88.0, and thus a sensitivity of 9.1, gives a final blend which has a Research Method octane number of 101.4, a Motor Method octane number of 93.6, and therefore a sensitivity of 7.8, all on a leaded basis, i.e. 3 cc. TEL per gallon (except the ether). Thus the startling effect discovered is a blend sensitivity which is lower than could be predicted on the basis of the octane numbers of the ether and the base hydrocarbon gasoline, and in fact lower than either the ether or the base gasoline by themselves.

In lowering the sensitivity of the final gasoline above, the methyl tertiary-butyl ether acted as if it had, in effect, a sensitivity of 2.5 rather than the 9.5 determined for pure ether alone. This "effective" sensitivity is the difference between the effective Research and Motor Method ratings calculated from the respective ratings of the base gasoline and the final blend by solving for the effective ratings of the ether as unknown variables in proportion to its concentration in the blend.

Thus in the above example, the effective sensitivity $(S_e)$ of the ether was the effective Research Method octane number $(R_e)$ of the ether minus the effective Motor Method octane number $(M_e)$ of the ether:

$$S_e = R_o - M_e$$
$$= \left[\frac{101.4 - 080 \times 97.1}{0.20}\right] - \left[\frac{93.6 - 0.80 \times 88.0}{0.20}\right]$$
$$= 2.5$$

For octane ratings above 100, the CRC 1952 scale is used. In this method, the octane rating is related to the Army-Navy Performance Number and is defined by the formula, $$ON = 128 - \frac{2800}{PN}$$

A large number of blends containing lower branched chain dialkyl ethers in base gasolines of varying hydrocarbon type composition have been evaluated. The base gasolines were aromatics (xylenes), olefins (purified $C_3$ polymer), naphthenes (cyclohexane), paraffins (75 octane primary reference fuel), and mixtures thereof. All blends contained 3 cc. TEL per gallon.

It has been discovered that the effectiveness of the ethers in respect to octane numbers and sensitivity is especially great in aromatic base gasolines containing a very special concentration range of naphthenes. This finding is very surprising since it would be expected that the ethers would be most effective in a base gasoline containing a paraffin as the only non-aromatic compound. Naphthenes are known to have blending characteristics similar to olefins. Olefins, however, are generally considered detrimental to the blending performance of high octane components. For example, with 20% by volume of diisopropyl ether in a base gasoline containing 50% by volume aromatic hydrocarbons and 50% by volume of non-aromatic hydrocarbons, the effective octane numbers (Research Method/Motor Method) for the ether are 118/114 when the non-aromatic component is a paraffin, but only 111/105 or 112/108 when the non-aromatic component is an olefin or a naphthene, respectively. However, the addition of a carefully controlled amount of naphthenes to a base gasoline containing both aromatics and paraffins results in increasingly higher effective octane ratings for the ethers. Thus, while holding the aromatic content of a base gasoline constant at 50% by volume, substituting naphthenes for some of the paraffins to obtain naphthene contents from 5% to 10% to 20% by volume results in effective octane ratings for diisopropyl ether (at 20% by volume in the final blend) of 119/116, 119.5/118, and 120/120, respectively. Thus, these values are much superior to the 118/114 obtained when no naphthenes are present, i.e., when the non-aromatic hydrocarbons are all paraffins, especially in respect to the sensitivity of the final blends.

As in the above discussion, whenever percentage concentrations of hydrocarbons are mentioned in this specification it will be understood that the percentages refer to the base hydrocarbon mixture, i.e., excluding the ethers, unless otherwise stated. On the other hand percentage concentrations of the ethers refer to the final gasoline blend containing both the ether and the base hydrocarbon mixture, unless otherwise stated.

It is evident then that the use of particular concentrations of naphthenes not only improves the effective octane rating of the ether but even more importantly improves the effective sensitivity as well. This improvement in sensitivity is primarily the result of greatly improved effective Motor Method octane number. For instance, in a base gasoline wherein the aromatic content is held constant at 50% by volume, the effective Motor Method octane number of methyl tertiary-butyl ether (at a concentration of 20% by volume in the final blend) increases from 113 to 115, 119, and 121 as the naphthene concentration is increased from 0% (50% paraffin) to 2%, 5%, and 10% by volume, respectively. The effective sensitivity of the ether is lowered from 8 to 6, 2, and 0, respectively.

In increasing the naphthene content of the aromatic base gasoline, a concentration is eventually reached where a further addition of naphthenes does not increase the advantage obtained but eventually begins to reduce the effective octane number of the ether. This transition concentration is at about 20% by volume naphthenes. At about this concentration, a further slight addition of naphthenes, e.g. up to a concentration of 25% by volume, has no apparent additional effect. With a little more naphthenes the effective octane numbers of the ether start declining. With increasingly higher naphthene concentrations, the effective octane numbers of the ethers rapidly decline until ultimately the low values of about 112/108 for diisopropyl ether and about 119/102 for methyl tertiary-butyl ether are reached when naphthene is the sole non-aromatic component, e.g. in a base gasoline containing 50% aromatics.

The benefit obtained from the addition of naphthenes doesn't become appreciably significant until the naphthenes reach a concentration of about 2% by volume. Therefore, it is preferred to have at least 2% by volume naphthenes and, more especially, at least 5% by volume naphthenes in the base gasoline. A naphthene concentration above 8% by volume is particularly effective.

Aromatics must be present in the base gasoline in a substantial concentration because in the absence of aromatics the effect of naphthenes is not beneficial but actually deleterious. At least about 15% by volume aromatics should be present to obtain the benefit from the naphthenes. At least 25% by volume is desirable and at least 30% by volume aromatics is especially effective. Aromatic concentrations above 40% by volume are particularly preferred. However, since extremely high concentrations of aromatics do not give a clean burning fuel, it is preferred to have no more than 75% by volume aromatics and more particularly no more than 70% by volume aromatics in the base gasoline. Also, because aromatics themselves have fairly high sensitivities, it is especially preferred that the concentration of aromatics in the base gasoline be no greater than about 60% by volume.

The beneficial effect of these particular concentrations of naphthenes on the effective octane number of branched chain di-lower-alkyl ethers persists even in the presence of low concentrations of olefins. Although optimum benefit is obtained with no olefins present, excellent results are obtained with olefin concentrations in the base gasoline up to about 10% by volume. With olefin concentrations above 10% little benefit is obtained from the addition of naphthenes and in some cases the naphthenes are detrimental. For example, in an aromatic base gasoline containing 5% olefin and 45% paraffin, on a volume basis, an increase in naphthene content from 5% to 10% to 20% by volume gives effective octane numbers for diisopropyl ether of about 118/116, 119/117, and 119.5/119, respectively. This is while maintaining a constant olefin-to-paraffin ratio and holding the aromatic concentration at 50% by volume. However, starting with 15% olefin and 35% paraffin in the base blend, the effective octane numbers for the ether at naphthene concentration of 5%, 10%, and 20% are about 117/114, 117.5/114.5, and 118/114, respectively, which amounts to practically no advantage in having naphthenes present in the base gasoline hydrocarbon mixture. The concentration of ether in each case is 20% by volume in the final gasoline blend. Thus it can be seen that at low olefin concentrations the greatest improvement again is in the Motor Method octane number, which therefore gives improved sensitivities. Similarly, the effective Motor Method octane numbers for methyl tertiary-butyl ether in a base gasoline initially having 7.5% olefin and 42.5% paraffin are 119, 119.5, and 120 at naphthene concentrations of 5%, 10%, and 15% by volume, respectively, compared to 113, 113, and 112, respectively, when the olefin content is doubled (to 15% by volume), again with the aromatic concentration in the base gasoline held constant at 50% by volume, and maintaining a constant olefin-to-paraffin ratio in each case as the naphthene concentration is changed. The concentration of ether in the final blend is 20% by volume in each case.

As long as the essential limitations are met as to the composition of the base gasoline hydrocarbons, as described above, the benefits of the invention are obtained generally regardless of the concentration of the ether in the final blend. However, from an economic point of view, and to insure proper volatility requirements and adequate gasoline properties in other respects, it is preferred that the concentration of the ether in the final blend be not more than about 50% by volume, more especially not more than about 25% by volume. Particularly effective concentrations are those of about 20% by volume and below. On the other hand, to obtain the benefits of the invention to a substantial degree it is generally desirable to use at least about 2% by volume of the ether in the final blend, and more especially at least about 5% by volume. A particularly preferred concentration range of the ether is from about 7% to about 15% by volume in the final blend.

Ethers suitable for practice of the invention are the branched chain di-lower-alkyl ethers containing a single oxygen atom, and at least 4 and no more than 8 carbon atoms, more especially 5 to 7 carbon atoms. Ethers outside this range are not only not useful in the present compositions but are, on the contrary, quite deleterious. For example, dialkyl ethers which do not contain at least one branched chain alkyl group have such low octane numbers that their incorporation into gasoline, even in very small concentrations could not be tolerated for use in modern high compression engines. Moreover, ethers containing either less or more carbon atoms would not have suitable volatility to accomplish the purposes of the invention. At least one, and preferably both, of the two carbon atoms attached to the single oxygen atom of the ether should preferably be a secondary or a tertiary carbon atom. Within the preferred class of branched chain dialkyl ethers having 5 to 7 carbon atoms, methyl tertiary-butyl ether, isopropyl tertiary-butyl ether and especially diisopropyl ether, are superior and are particularly preferred. Other suitable ethers within the scope of the invention include ethyl tertiary-butyl ether, isopropyl secondary-butyl ether, methyl tertiary-amyl ether, ethyl isopropyl ether, methyl secondary-butyl ether and methyl tertiary-hexyl ether.

An especially suitable ether component for the composition of the invention is a commercial diisopropyl ether product containing a minor amount of isopropyl alcohol and obtained by the reaction of propylene and water in a sulfuric acid medium, for example in accordance with the processes disclosed in Francis, U.S. 2,055,720 or in Oldershaw, U.S. 2,178,186. A typical product will contain a high concentration of diisopropyl ether, a smaller but substantial concentration of isopropyl alcohol, small concentrations each of ethyl isopropyl ether, ethyl alcohol, $C_6$ to $C_{12}$ propylene polymer, water, and in some cases minute amounts of $C_2$ to $C_4$ hydrocarbons. The following are analyses of specific compositions which exemplify such suitable ether products:

TABLE II

|  | Percent by Weight | | | | |
| --- | --- | --- | --- | --- | --- |
|  | A | B | C | D | E |
| Diisopropyl ether | 97.6 | 98.1 | 85.9 | 89.1 | 85.3 |
| Isopropyl alcohol | 1.1 | 1.0 | 4.7 | 7.7 | 12.2 |
| Ethyl isopropyl ether | <0.1 | <0.1 | 0.3 | <0.1 | 0.1 |
| Ethyl alcohol | 0.5 | 0.5 | 0.5 | 0.2 | 0.2 |
| $C_6H_{12}$ |  |  | 1.2 | 2.2 | 1.1 |
| $C_9H_{18}$ | 0.4 | <0.1 | 3.0 | 0.6 | 0.2 |
| $C_{12}H_{24}$ | 0.2 |  | 3.8 | <0.1 | 0.1 |
| $H_2O$ | <0.1 | 0.2 | 0.6 | 0.2 | 1.0 |

The gasoline composition is most useful as fuel for automotive internal combustion spark ignition engines and as such the hydrocarbon components which comprise the base gasoline will be primarily fractions obtained from the distillation and processing of crude petroleum oils such as thermally or catalytically reformed, thermally or catalytically cracked, straight-run, polymer, or products of sulfuric acid or hydrofluoric acid alkylation of lower molecular weight olefins and isoparaffins, e.g., of butylene and isobutane. The polymer gasolines and cracked fractions preferably are hydrogenated to reduce their olefin content. Of course, mixtures of such components are especially suitable. Automotive gasoline hydrocarbons have a boiling range of from about the boiling points of $C_3$ to $C_4$ hydrocarbons to about 450° F., and the mixtures thereof suitable as the hydrocarbon base of the composition of the invention will preferably have an ASTM Method D-86 distillation range of from about 80° to 100° F. to about 375° to 425° F.

Besides the ether, the composition of the invention will advantageously contain an antiknock concentration of a lead antiknock agent, i.e., a lead anti-detonant, such as a tetra-lower-alkyl lead compound, for example tetraethyl lead. The concentration of the lead antiknock agent is preferably at least 0.5 cc. per U.S. gallon and up to 6 cc. per gallon, more especially at least 1 cc. per gallon and no more than 3 cc. per gallon. When a lead antiknock agent is used, a halohydrocarbon scavenger such as ethyl dibromide or a mixture of ethylene dibromide and ethylene dichloride is preferably added in conjunction therewith, especially in an amount of from about 1.0 to about 1.5 or 1.6 theories. Spark plug anti-foulants such as tricresyl phosphate, dimethyl xylyl phosphate, n-octyl diphenyl phosphate, and diphenyl cresyl phosphate can be advantageously added to the composition of the invention in conjunction with lead antiknock agent. The preferred concentration of the phosphate compounds is no less than 0.01 theory and no more than 0.6 theory and more especially preferred concentrations are at least 0.1 theory and no more than 0.4 theory. A "theory" as the term is used herein (referring to a concentration of a halogen or phosphorus compound) designates the amount of halogen or phosphorus compound stoichiometrically equivalent to the lead in the lead antiknock agent present on the basis of an assumed formation of lead dihalide and lead orthophosphate. Also useful in the composition of the invention are other antiknock agents such as xylidene, N-methylaniline and methylcyclopentadienyl manganese tricarbonyl.

Other additives suitably used if desired in the composition of the invention include the various anti-icing agents such as N—$C_{12-18}$-alkylpropylenediamine and dimethylformamide; combustion chamber deposit modifiers such as glycol esters of boric acid, for example, isopropyl 2-methyl-2,4-pentanediol borate, 2-methyl-2,4-pentanediol monoacid borate, bis(1,1,3-trimethyl-trimethyleneoxy) boric oxide, and the like; antioxidants such as N,N'-disecondarybutylphenylenediamine, 2,6-ditertiarybutyl-4-methyl phenol, 4,4'-methylene bis(2,6-ditertiarybutylphenol), and the like; corrosion inhibitors such as polymerized linoleic acids and N,C-disubstituted imidazolines; metal deactivators such as N,N'-disalicylal-1,2-propanediamine; and dyes, silicone oils, and the like.

The following are examples of compositions according to the present invention, with concentrations expressed as percent by volume unless otherwise noted:

*Example I*

Motor gasoline comprising 5% diisopropyl ether and 95% base gasoline hydrocarbons and containing 3.0 cc. tetraethyl lead per gallon
1.0 theory ethylene dichloride
0.5 theory ethylene dibromide
0.3 theory dimethyl xylyl phosphate The base gasoline hydrocarbons consist of a mixture of 10% olefins, 5% naphthenes, 39% aromatics and 46% parafins, and are obtained by blending 5% isopentane, 7% butane, 60% high-severity catalytic reformate, 5% full boiling range catalytically cracked gasoline, 8% light catalytically cracked gasoline, and 15% light alkylate.

*Example II*

Motor gasoline comprising 15% methyl tertiary-butyl ether, 85% base gasoline hydrocarbons, and containing 1.0 theory ethylene dichloride
0.5 theory ethylene dibromide
1.5 cc. tetraethyl lead per gallon.

The base gasoline hydrocarbons consist of a mixture of 2% olefins, 7% naphthenes, 53% paraffins, and 38% aromatics and are obtained by blending 60% high-severity catalytic reformate and 40% hydrogenated light catalytically cracked gasoline (hydrogenated to a Bromine No. reduction of 94%).

*Example III*

Motor gasoline comprising 7.5% isopropyl tertiary-butyl ether, 92.5% base gasoline, and containing 1.9 cc. tetraethyl lead per gallon
1.0 theory ethyl dibromide
0.2 theory diphenyl cresyl phosphate
30 p.p.m. (wt.) N—$C_{12}$-alkyl-1,3-propylenediamine The base gasoline hydrocarbons consist of 4.0% olefins, 7.5% naphthenes, 41.5% aromatics, and 47% paraffins and are obtained by blending 5% butane, 10% light alkylate, 5% full-boiling range catalytically cracked gasoline, 65% high-severity catalytic reformate, and 15% hydrogenated light catalytically cracked gasoline (hydrogenated to 94% Bromine No. reduction).

*Example IV*

Motor gasoline comprising 8% methyl-tertiary butyl ether, 92% base gasoline hydrocarbons and containing 2.1 cc. tetraethyl lead per gallon
1.0 theory ethylene dichloride
0.5 theory ethylene dibromide
0.06 gram N-butyl-p-aminophenol per gallon The base gasoline hydrocarbons consist of 5% olefins, 6% naphthenes, 38% aromatics, and 51% paraffins and are obtained by blending 5% isopentane, 8% butane, 12% hydrogenated butylene polymer, 60% high-severity catalytic reformate, and 15% hydrogenated light catalytically cracked gasoline (hydrogenated to 63% Bromine No. reduction).

*Example V*

Motor gasoline comprising 9.5% diisopropyl ether and 90.5% base gasoline hydrocarbons. The base gasoline hydrocarbons consist of 2% olefins, 16% naphthenes, 29% aromatics, and 53% paraffins and are obtained by blending 60% moderate severity catalytic reformate and 40% hydrogenated light catalytically cracked gasoline (hydrogenated to 94% Bromine No. reduction).

Example VI

Motor gasoline comprising 12% diisopropyl ether, 88% base gasoline hydrocarbons and 1.0 cc. tetraethyl lead per gallon. The base gasoline hydrocarbons consist of 10% olefins, 6% naphthenes, 49% aromatics, and 35% paraffins and are obtained by blending 11% light catalytically cracked gasoline, 11% butane, and 78% high-severity catalytic reformate.

Example VII

Motor gasoline comprising 3% isopropyl tertiaryamyl ether, 97% base gasoline hydrocarbons and 2.6 cc. tetraethyl lead per gallon. The base gasoline hydrocarbons consist of 6% olefins, 8% naphthenes, 61% aromatics, and 25% paraffins and are obtained by blending 10% butane, 75% aromatic extract of a full boiling range catalytic reformate, 10% light catalytically cracked gasoline, and 5% hydrogenated (to essentially saturation) light catalytically cracked gasoline.

Example VIII

Motor gasoline comprising 17% diisopropyl ether of composition D of Table II (i.e., 17% of a commercial diisopropyl ether product), 83% base gasoline hydrocarbons, and containing 2.5 cc. tetraethyl lead per gallon
1.0 theory ethylene dichloride
0.5 theory ethylene dibromide
0.2 theory tricresyl phosphate
0.06 gram N,N'-disecondarybutyl p-phenylene diamine per gallon
1.0 p.p.m. by wt. dimethyl poly siloxane fluid having a viscosity at 25° C. of 500 centistokes.

The base gasoline hydrocarbons consist of 9% olefins, 12% naphthenes, 45% aromatics, and 34% paraffins and are obtained by blending 6% butane, 12% light catalytically cracked gasoline, 8% light straight-run gasoline and 74% catalytic reformate.

I claim as my invention:

1. A gasoline composition consisting essentially of a branched chain di-lower-alkyl ether having from 4 through 8 carbon atoms in a mixture of naphthene, aromatic and paraffin gasoline boiling range hydrocarbons in which mixture the concentration of naphthenes is from about 2% to about 25% by volume, the concentration of aromatics is at least 15% and no more than 75% by volume and which mixture contains no more than about 10% by volume of olefins, the concentration of ether in the composition being no more than about 50% by volume.

2. A gasoline composition in accordance with claim 1 wherein the di-lower-alkyl ether contains from 4 through 8 carbon atoms, and the concentration of the ether in the composition is from about 2% to about 25% by volume.

3. A gasoline composition in accordance with claim 1 wherein the concentration of aromatics in the hydrocarbon mixture is at least 25% and no more than 70% by volume and wherein the di-lower-alkyl ether contains from 4 through 8 carbon atoms, and the concentration of the ether in the composition is from about 2% to about 25% by volume.

4. A gasoline composition in accordance with claim 3 wherein the ether is methyl tertiary-butyl ether.

5. A gasoline composition in accordance with claim 3 wherein the ether is isopropyl tertiary-butyl ether.

6. A gasoline composition in accordance with claim 3 wherein the ether is diisopropyl ether.

7. A gasoline composition consisting essentially of a branched chain di-lower-alkyl ether having from 4 through 8 carbon atoms in a mixture of naphthene, aromatic and paraffin gasoline boiling range hydrocarbons in which mixture the concentration of naphthenes is from about 5% to about 20% by volume, the concentraion of aromatics is at least 30% and no more than 75% by volume and which mixture contains no more than about 10% by volume of olefins, the concentration of ether in the composition being no more than about 50% by volume.

8. A gasoline composition consisting essentially of a branched chain di-lower-alkyl ether having from 5 through 7 carbon atoms in a mixture of naphthene, aromatic and paraffin gasoline boiling range hydrocarbons in which mixture the concentration of naphthenes is from about 5% to about 20% by volume, the concentration of aromatics is at least 40% and no more than 70% by volume and which mixture contains no more than 10% by volume of olefins, the concentration of ether in the composition being no more than about 50% by volume.

9. A gasoline composition consisting essentially of commercial diisopropyl ether in a mixture of naphthene, aromatic, and paraffin gasoline boiling range hydrocarbons in which mixture the concentration of naphthenes is from about 8% to about 20% by volume, the concentration of aromatics is at least 40% and no more than 60% by volume and which mixture contains no more than about 10% by volume olefins, and the concentration of the ether in the composition is from about 5% to about 20% by volume.

10. A gasoline composition consisting essentially of a branched chain di-lower-alkyl ether having from 4 through 8 carbon atoms in a mixture of naphthene, aromatic and paraffin gasoline boiling range hydrocrabons in which mixture the concentration of naphthenes is from about 2% to about 25% by volume, the concentration of aromatics is at least 15% and no more than 75% by volume and which mixture contains no more than 10% by volume of olefins, said composition containing no more than about 50% by volume of ether and from 0.5 to 6 cc. of a lead antiknock agent per gallon of gasoline.

11. A gasoline composition in accordance with claim 10 wherein the concentration of aromatics in the hydrocarbon mixture is at least 25% and no more than 75% by volume, the concentration of ether in the composition is from about 2% to about 25% by volume, and the antiknock agent is a tetra-lower-alkyl lead compound.

12. A gasoline composition in accordance with claim 10 wherein the concentration of aromatics in the hydrocarbon mixture is at least 25% and no more than 75% by volume, the concentration of naphthenes in the mixture is from 5% to about 20% by volume, the concentration of ether in the composition is from 2% to about 25% by volume, and the antiknock agent is tetraethyl lead.

References Cited by the Examiner

UNITED STATES PATENTS

| | | | |
|---|---|---|---|
| 2,046,243 | 6/1936 | Buc | 44—56 |
| 2,360,585 | 10/1944 | Ross et al. | 44—80 |
| 2,409,746 | 10/1946 | Evans et al. | 44—56 |

OTHER REFERENCES

"Effect of Gasoline Sensitivity on Road Octane Number," by Morris, The Oil and Gas Journal, November 26, 1956, pages 33–34.

"The Chemical Constituents of Petroleum," Sachanen, Reinhold Pub. Corp., 1945, page 260.

Paper presented before American Petroelum Institute, Nov. 7, 1941, "Improve Motor Fuels Through Selective Blending" by Wagner et al., pages 8–13.

DANIEL E. WYMAN, *Primary Examiner.*

JULIUS GREENWALD, *Examiner.*